(No Model.)
G. D. KITTOE.
INSTRUMENT FOR COUNTING AND REGISTERING THE NUMBER OF REVOLUTIONS OF A ROTATING SHAFT.
No. 279,095.  Patented June 5, 1883.
FIG. 1.
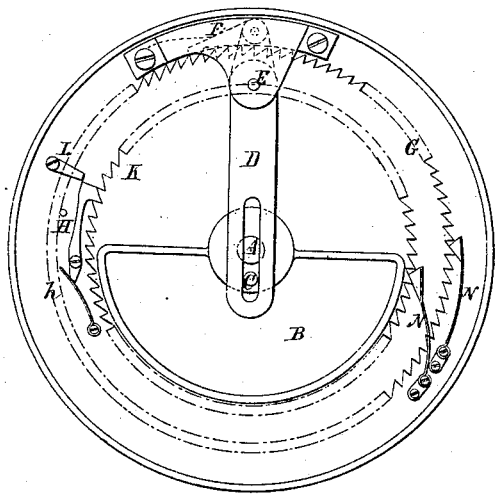
FIG. 3.
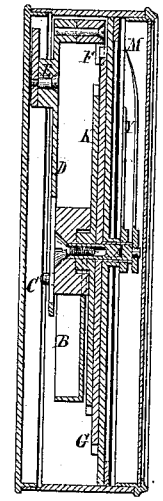
FIG. 5.
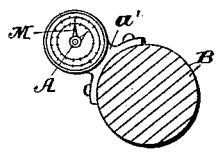
FIG. 2.
FIG. 4.
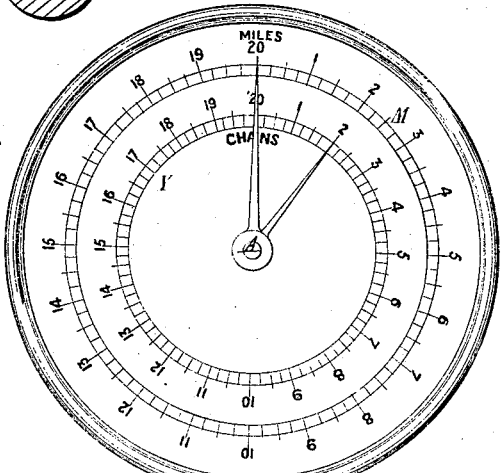
Witnesses,
J. A. Rutherford
Robert Everett
Inventor:
George D. Kittoe.
By James L. Norris.
Atty.

UNITED STATES PATENT OFFICE.

GEORGE D. KITTOE, OF KENSINGTON, COUNTY OF MIDDLESEX, ENGLAND.

INSTRUMENT FOR COUNTING AND REGISTERING THE NUMBER OF REVOLUTIONS OF A ROTATING SHAFT.

SPECIFICATION forming part of Letters Patent No. 279,095, dated June 5, 1883.

Application filed February 24, 1883. (No model.) Patented in England January 4, 1883, No. 60.

*To all whom it may concern:*

Be it known that I, GEORGE DOMINICUS KITTOE, a citizen of England, residing at Kensington, in the county of Middlesex, England, have invented a new or Improved Instrument for Counting and Registering the Number of Revolutions of a Rotating Shaft or Wheel, (for which I have obtained provisional protection in Great Britain, dated January 4, 1883, No. 60,) of which the following is a specification.

My invention relates to the construction of an instrument to be affixed to a rotating shaft or wheel for the purpose of counting and registering the number of its revolutions. It may be applied to any revolving part of an engine or machine, or to the wheel of a bicycle, tricycle, or any vehicle, so that when the circumference of the wheel is known the distance traveled can be readily ascertained by inspecting the register of the number of its revolutions, and this whatever be the direction in which the vehicle travels. As this is a very common application of such instruments, I will describe the construction of one according to my invention suitable for measuring the distance traveled over by a wheel having a circumference of 13.2 feet, so that one hundred of its revolutions are equivalent to one-quarter of a mile. I would have it understood, however, that the proportions of the gearing employed may be varied to suit other dimensions and distances or other multiples of revolutions without departing from the principles according to which the instrument is constructed and operates.

Figure 1 of the accompanying drawings shows the interior of the instrument with its back cover removed. Fig. 2 is a view of part of the same somewhat modified in form; and Fig. 3 is a vertical section, and Fig. 4 is a front view, of the dial and indices, registering-chains, quarters of miles, and miles up to twenty miles; and Fig. 5, a view showing one method of attaching the instrument to a shaft.

On a center-pin, A, which is the arbor of the larger index M, is mounted, free to revolve, a weight, B, which may be of semicircular form, as shown. On the central boss of this weight is a crank-pin, C, as shown in Fig. 1, or it might be an eccentric, as shown in Fig. 2, working in the slot of a lever, D, which is pivoted at E and carries a spring-pawl, F, engaging with the teeth of a wheel, G, which in this case has one hundred teeth, and is fixed on a tubular arbor carrying the smaller index Y. On the face of the wheel G is mounted a pawl, H, which, by means of a spring, $h$, is usually kept disengaged from the teeth of a wheel, K, in this case having eighty teeth, fixed on the arbor A. A stud, L, is fixed to the casing, with its nose projecting so as to come in the way of the pawl H and push it into engagement with the teeth of K. Two springs, N, are fixed to the casing, with wedge ends arranged to enter between teeth of the wheels G and K and hold them with certain firmness.

The instrument may be connected to an angle-iron, $a'$, secured to the periphery of the shaft B', as shown in Fig. 5, or be connected to the shaft at any desired point by any other form of bracket.

The instrument being fixed on a revolving shaft or wheel, so as to revolve therewith, its action is as follows: The weight B tends by gravity to hang vertically, and therefore its crank-pin or eccentric C has the effect of causing the lever D to make a to-and-fro stroke in every revolution. The pawl F thus causes the wheel G to move one tooth onward, and therefore one hundred revolutions of the instrument cause the small hand Y to make one complete revolution, indicating one hundred times $13.2 =$ one thousand three hundred and twenty feet, or one-quarter of a mile. The inner circle of the dial being graduated by twenty divisions, each will indicate five revolutions— that is to say, five times $13.2 =$ sixty-six feet, or one chain. Once in every revolution the wheel G brings the pawl H under the stud L, which presses it into gear with the teeth of the wheel K, causing it to advance one tooth. The larger hand M will thus make one complete revolution when the smaller hand Y makes eighty revolutions, equivalent to twenty miles, and therefore the outer dial, being graduated by twenty divisions each, will indicate a mile, and each of these may be subdivided into four parts, each indicating one-quarter of a mile.

Although I have described an instrument geared and graduated for indicating distance traveled over by the wheel of a vehicle, it is obvious that the gear and graduation might be varied for indicating simply numbers of revolutions, as those of an engine-shaft. Thus, retaining the wheel G with one hundred teeth, and making the wheel K also with one hundred teeth, and graduating the dials each to one hundred divisions, the one hand, Y, would point to units of revolutions and the other hand, M, to hundreds, one complete revolution of the latter being made in ten thousand revolutions of the instrument. Again, by making the arbor of the wheel K tubular, and passing through it an arbor carrying another wheel—such as K—also fixing on K a pawl—such as H—to work this third wheel, an index-hand on its arbor would indicate for each division ten thousand, and for a whole revolution one million revolutions of the instrument. Retaining the same construction, the carrying from the one wheel, G, to the next wheel, K, might also be varied by elongating either the back of the pawl H or the front of the stud L, so that the pawl might be kept in gear for more than one tooth.

Having thus described the nature of my invention and the best means I know of carrying it out in practice, I claim—

An instrument for counting and registering the number of revolutions of a rotating shaft or wheel on which it is fixed, the said instrument having a freely-suspended weight with a crank or eccentric on its boss engaged in the slot of a lever carrying a pawl engaging the teeth of a ratchet-wheel, with an index on its axis, and the said ratchet-wheel having on it a pawl, which, in passing a fixed stud, is made to engage the teeth of another ratchet-wheel having an index on its axis, substantially as herein described.

In testimony whereof I have signed my name to this specification, in the presence of two subscribing witnesses, this 29th day of January, A. D. 1883.

GEO. DOMINICUS KITTOE.

Witnesses:
OLIVER IMRAY,
JNO. P. M. MILLARD,
*Both of 28 Southampton Buildings, London, W. C.*